Figure 1:
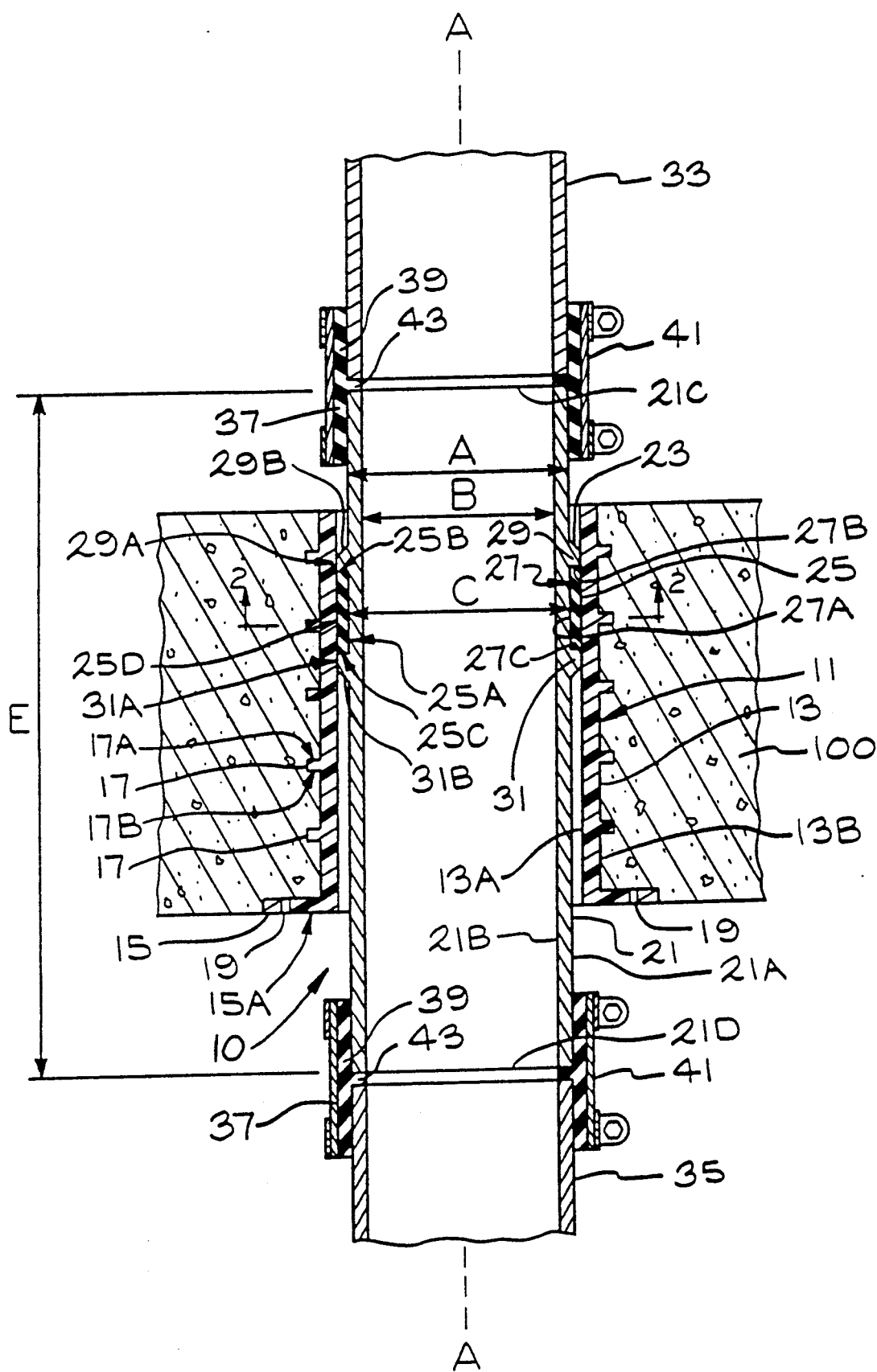

United States Patent

Cornwall

Patent Number: 5,263,746
Date of Patent: Nov. 23, 1993

[54] ADJUSTABLY MOUNTED FITTING ASSEMBLY

[76] Inventor: Kenneth R. Cornwall, 4963 Springfield Dr., Dunwoody, Ga. 30338

[21] Appl. No.: 845,966
[22] Filed: Mar. 4, 1992
[51] Int. Cl.⁵ ............ F16L 3/04; F16L 5/00; F16L 17/00; F16L 41/00
[52] U.S. Cl. .................. 285/158; 285/192; 285/347
[58] Field of Search ........ 285/158, 55, 189, 192, 285/215, 236, 345, 347

[56] References Cited

U.S. PATENT DOCUMENTS

| | | | |
|---|---|---|---|
| 3,201,150 | 8/1965 | Aydelott | 285/347 X |
| 3,502,356 | 3/1970 | Schmunk | 285/347 X |
| 3,830,530 | 8/1974 | Glover | 285/347 X |
| 4,627,647 | 12/1986 | Hauff | 285/192 |

FOREIGN PATENT DOCUMENTS

978055 12/1964 United Kingdom ............... 285/347

Primary Examiner—Neill R. Wilson
Attorney, Agent, or Firm—Ian C. McLeod

[57] ABSTRACT

An improved fitting assembly (10) to be mounted in a coupling (11) embedded in a partition means (100) for connecting fluid carrying pipes (33,35) to the opposed open ends of the fitting assembly, is described. The fitting assembly is comprised of a tubular, non-flammable fitting conduit (21) that has an annular enlarged portion (23) on the outside sidewall (21A) of the conduit. The enlarged portion has an annular recess (27) that provides for mounting an annular, plastic gasket (25). The gasket is bonded in the recess and when the fitting conduit is mounted inside the coupling, the enlarged portion and gasket are in contact with the inside wall (13A) of the coupling. The gasket is then bonded to the coupling, which is plastic, to form a seal between the fitting assembly and the coupling. The contact point between the fitting assembly and the coupling is adjustable along the length of the coupling. The seal prevents the spread of smoke and fire between floors or the like in a building.

45 Claims, 2 Drawing Sheets

ADJUSTABLY MOUNTED FITTING ASSEMBLY

BACKGROUND OF THE INVENTION

(1) Field of the Invention

The present invention relates to an improved adjustably mounted fitting assembly for use in connecting fluid carrying pipes through a partition, such as a cement floor in a building. In particular, the present invention relates to an adjustably mounted fitting assembly that can be quickly and easily mounted inside of and sealed to a coupling embedded in a partition, such as a concrete floor in a building, for connecting to fluid carrying pipes provided on either side of the partition. The fitting assembly is comprised of a fitting conduit, preferably tubular in shape, having an annular enlarged portion provided on the outside sidewall and an annular gasket mounted in a recess in the enlarged portion. The fitting conduit is preferably made of a metal material, such as cast iron, while the gasket is made of a plastic material and is integrally bonded in the recess in the enlarged portion. When the gasket is mounted in the annular recess, the outer diameters of the gasket and of the enlarged portion are parallel and in contact with the inside diameter of the inside wall of the coupling. The coupling is also preferably a plastic member and the gasket is then solvent cemented or bonded to the inside wall of the coupling. This provides a seal between the fitting assembly and the inside wall of the coupling that is waterproof and that prevents the spread of smoke and fire. When the fitting assembly is mounted inside the coupling, the opposite ends of the fitting conduit extend beyond the partition and the coupling. This provides for connecting fluid carrying pipes to each end of the fitting conduit. The enlarged portion and the gasket also provide for adjusting the sealing point between the fitting assembly and the inside wall of the coupling. This provides for varying the distance that the ends of the fitting conduit extends beyond the coupling and the partition, which is useful for connecting the fitting conduit to fluid pipes that have been previously mounted in an existing building construction.

(2) Prior Art

Couplings embedded in partitions, such as concrete walls and floors are well known. The couplings generally have a cylindrical sleeve that is mounted to a form for the wall or floor. After the floor or wall is poured, the form can be removed or it can remain in place. The sleeve then provides an opening through the partition and serves for mounting fluid pi through the partition.

My U.S. Pat. No. 4,261,598 describes a coupling for a concrete floor. The coupling is comprised of a tubular sleeve portion that is provided with a flange at one end for connecting the coupling to a form for the floor. When the floor is poured, the sleeve is embedded in the concrete to provide an opening through the floor. However, the sleeve has a cylindrical outside wall that tends to provide a channel for water seepage as the coupling expands and contracts in response to temperature changes. The sleeve is provided with an inner annular rim that has spaced apart parallel shoulders, perpendicular to the longitudinal axis of the sleeve. The shoulders serve to mount fluid carrying pipes extending from the coupling on either side of the partition. The fluid carrying pipes must be solvent welded or bonded inside the sleeve, abutting the inner annular rim.

In my U.S. Pat. No. 4,623,170, an improved coupling embedded in concrete is described. The coupling has multiple concentric rings on an outside wall of a sleeve portion of the coupling. This helps prevent leakage between the outside wall of the coupling and the concrete partition. The sleeve is provided with an inner annular rim that serves to mount fluid carrying pipes on either side of the partition. The pipes mounted inside the sleeve must be solvent welded or bonded to the sleeve and the inner rim.

My U.S. Pat. Nos. 4,583,565; 4,638,829; 4,724,858; 4,953,235, describe firestop fittings particularly adapted to prevent the spread of smoke and fire between floors in a multi-story building by plugging off any potential fire path through a vertical pipe mounted between the floors. These patents describe an assembly where a non-flammable plug is released by heat less than required for heat destruction of a plastic coupling mounted in a concrete floor. Upon being released, the plug moves into and seals in an iron fitting mounted inside of the plastic coupling to serve as a non-flammable barrier through the iron fitting. This retards the spread of fire through the plastic coupling by depriving the inside of the coupling of oxygen.

My U.S. Ser. No. 07/692,669 filed Apr. 29, 1991, describes a similar firestop fitting having a moveable plug for plugging off a vertical pipe mounted between fire rated floor members. U.S. Ser. No. 07/701,057 filed May 16, 1991, describes a firestop fitting having a moveable plug for plugging off a horizontal pipe mounted between vertical, fire rated wall members. These inventions are particularly adapted to prevent the spread of smoke and fire through the pipe by plugging off the inside of the pipe.

My U.S. Pat. No. 4,953,235 describes a trap fitting assembly that uses a flammable coupling vertically mounted through a concrete floor. A non-flammable sleeve is mounted inside the coupling and extends below the coupling for connection to a non-flammable J-pipe. The J-pipe contains water at a level sufficient to prevent smoke and fire from spreading through the floor through the flammable coupling. The sleeve prevents fire from spreading through the trap fitting by depriving the inside of the coupling of oxygen needed to sustain the spread of fire through the coupling. This invention is preferably adapted for a floor drain outlet or a tub.

My U.S. Ser. No. 07/700,406 filed May 15, 1991, describes a trap fitting assembly for mounting in a flammable floor to prevent the spread of smoke and fire through the floor and a lower ceiling. The fitting assembly is comprised of a flammable connection mounted inside of a non-flammable threaded nipple that is mounted in an opening in a support means supported in the floor. A non-flammable J-pipe threads onto a lower extension of the nipple and contains water at a level sufficient to prevent smoke and fire from spreading through the fitting assembly. This invention is preferably adapted for mounting in a tub box as the support means and the connection is preferably a T-connection for draining a tub through an overflow pipe and a drain pipe connected to a tub drain.

My U.S. Pat. No. 5,076,309 describes a firestop stubout assembly, which includes a non-flammable insert having an annular flange at one end. The insert is mounted inside of a flammable, plastic sleeve and locked in place by a plastic coupling that mounts over and around the flange portion of the insert. This invention is adapted to be mounted through fire rated wall members and, provides a means for coupling the sleeve to a water operated fixture mounted in a room and to fluid conduits mounted between the wall members.

What is needed is a fitting assembly that can be mounted inside of a coupling embedded in a partition to stop a fire. The fitting assembly needs to be able to connect fluid carrying conduits through the partition, whether or not the partition is a concrete member or a fire rated member, and whether or not the partition is a vertical wall member or a horizontal floor. The fitting assembly also needs to seal to the inside of the coupling so that the spread of smoke and fire and the seepage of water between the fitting assembly and the coupling is prevented. Further, the sealing point between the fitting assembly and the coupling needs to be adjustable along the length of the coupling. That way, the distance that the opposed ends of the fitting assembly extend beyond the partition and the end of the coupling can be adjusted. This is useful for connecting the fitting assembly to existing fluid carrying pipes provided on either side of the partition.

OBJECTS

It is therefore an object of the present invention to provide a fitting assembly that is adjustably mountable inside of a coupling, which has been embedded inside a partition, and that is connectable to fluid carrying pipes provided on either side of the partition. Further, it is an object of the present invention to provide an adjustably mountable fitting assembly that is comprised of a fitting conduit having a generally tubular shape that is mountable to seal inside of a coupling embedded in a partition means. Furthermore, it is an object of the present invention to provide a method for mounting a fitting assembly inside of a coupling, embedded in a partition means, for connecting to fluid carrying pipes provided on the opposed sides of the partition means. Still further, it is an object of the present invention to provide a fitting assembly that can be adjustably mounted and sealed inside a coupling embedded in a partition means to prevent the spread of smoke and fire and the seepage of liquids between the fitting assembly and the coupling. Finally, it is an object of the present invention to provide an adjustably mountable fitting assembly that is inexpensive to manufacture and easily mounted and sealed inside a coupling embedded in a partition means, and that can be easily connected to fluid carrying pipes provided on the opposed sides of the partition means. These and other objects will become increasingly apparent by reference to the following descriptions and to the drawings.

IN THE DRAWINGS

FIG. 1 is a cross-sectional view of an adjustably mountable fitting assembly 10 comprised of a fitting conduit 21 having an annular gasket 25 mounted in an annular recess 27 on an enlarged portion 23 of the fitting conduit 21, with the fitting assembly 10 sealed in a coupling 11 embedded in a concrete floor 100.

Figure 1A:
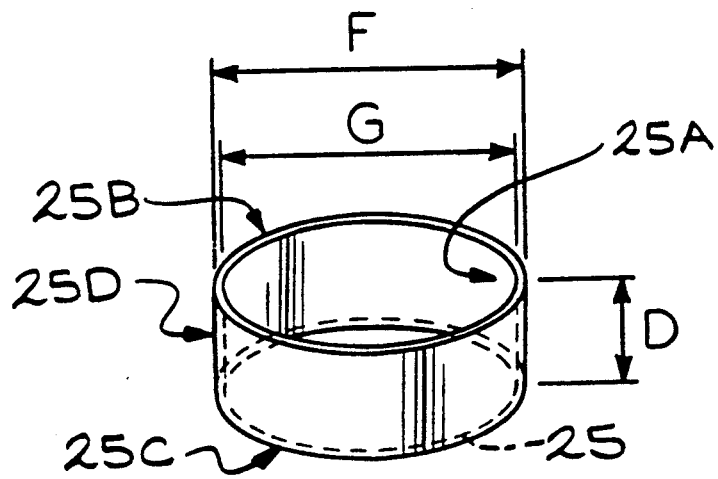

FIG. 1A is a perspective view of the annular gasket 25 that in the annular recess 27 of the fitting conduit 21 to provide the adjustably mountable fitting assembly 10 shown in FIG. 1.

Figure 2:
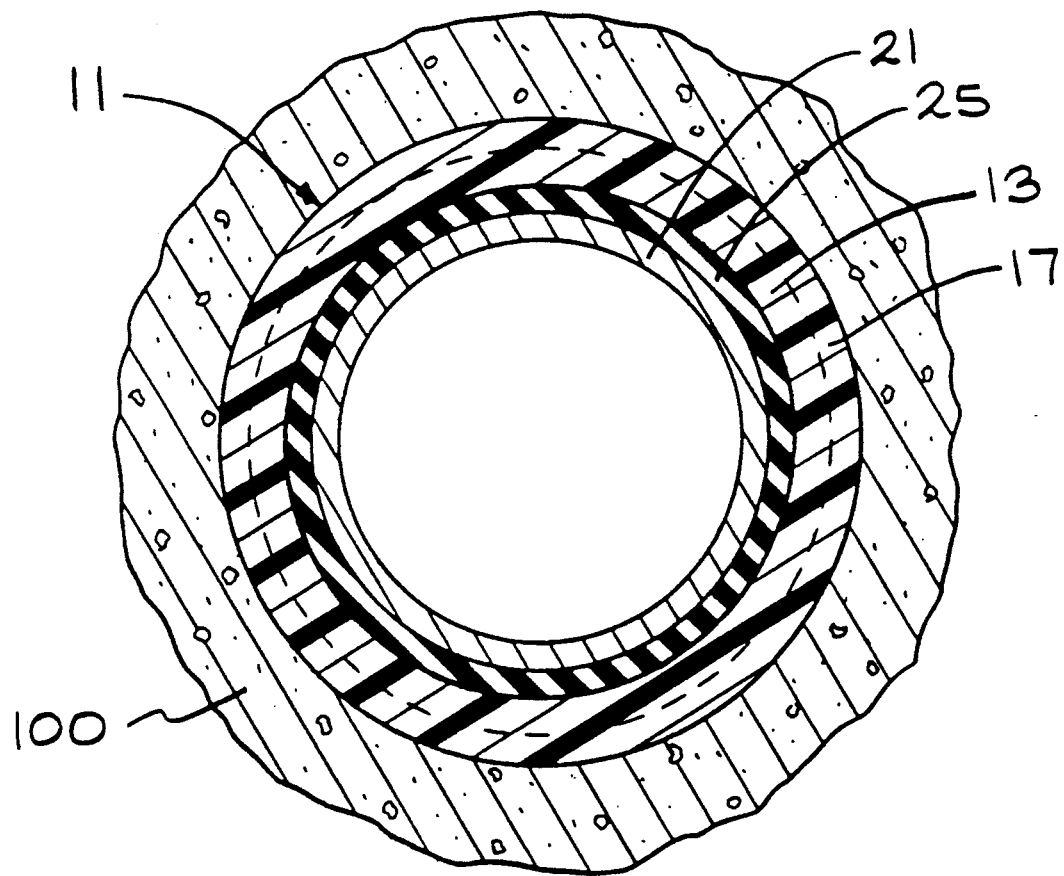

FIG. 2 is a cross-sectional view along line 2—2 of the fitting assembly 10 shown in FIG. 1 showing the annular gasket 25 bonded to the inner wall 27A of the recess 27 and sealed to the inside wall 13A of a tube portion 13 of coupling 11.

GENERAL DESCRIPTION

The present invention relates to an improved fitting assembly adapted to be mounted in a coupling means having opposed open ends with an inside wall forming an opening along a longitudinal axis of the coupling means and with an outside wall adapted to be mounted in a partition means, for joining fluid carrying pipe means to the fitting assembly and which prevents the spread of smoke and fire, and the seepage of fluids between the fitting assembly and the coupling means, which comprises: a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and an annular gasket means mounted in the recess provided in the enlarged portion of the outside wall of the conduit means to seal the conduit means to the inside wall of the coupling means to prevent the spread of smoke and fire, and the seepage of fluids between the fitting assembly and the coupling means.

Further, the present invention relates to a method for coupling pipe means through a partition means having a coupling means embedded in a partition means, wherein the coupling means has opposed open ends with an inside wall forming an opening along a longitudinal axis of the coupling means and with an outside wall mounted in the partition means, which comprises: providing a fitting assembly, which comprises: a non-flammable, elongate conduit means adapted to be mounted inside the coupling means and having opposed open ends forming an opening along an inside wall of the conduit means along the axis, wherein when the fitting assembly is mounted inside the coupling means, an outside wall of the conduit means is spaced from the inside wall of the coupling means with the opposed ends of the conduit means extending along the axis so that the conduit means is adapted to be connected to the pipe means at the opposed ends of the conduit means and wherein the outside wall of the conduit means is provided with an enlarged portion having a recess; and an annular gasket means mounted in the recess provided in the enlarged portion of the outside wall of the conduit means to seal the conduit means to the inside wall of the coupling means and to prevent the spread of smoke and fire, and the seepage of fluids between the fitting assembly and the coupling means; sealing the conduit means inside the coupling means by bonding the gasket means, mounted in the recess of the conduit means, to the inside wall of the coupling means so that the opposed ends of the conduit means can be connected to fluid carrying pipe means; and attaching fluid carrying pipe means to both ends of the conduit means.

Finally, the present invention relates to a building construction for a building having a fitting assembly joined to fluid carrying pipe means and mounted inside a coupling means having opposed open ends with an inside wall forming an opening along a longitudinal axis of the coupling means and with an outside wall of the coupling means mounted in a partition means in the building, to prevent the spread of smoke and fire, and the seepage of fluids between the fitting assembly and the coupling means, which comprises: the fitting assembly, which comprises: a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and an annular gasket means mounted in the recess in the enlarged portion of the outside wall of the conduit means to seal the conduit means to the inside wall of the coupling means and to prevent the spread of smoke and fire, and the seepage of fluids between the fitting assembly and the coupling means; and fluid carrying pipe means connected to both ends of the conduit means.

SPECIFIC DESCRIPTION

FIGS. 1 and 2 show a preferred embodiment of an adjustably mountable fitting assembly 10 mounted inside of a pipe coupling embedded in a concrete floor 100. The coupling 11 is preferably an integral unit made of injection molded plastic (PVC) and includes a cylindrically shaped tube 13 having a cylindrical inside wall 13A defining a longitudinal axis A—A and a parallel, cylindrical outside wall 13B. A flange 15 is provided at one end of the tube 13. The outside wall 13B has a series of parallel concentric rings 17 that have upper surfaces 17A and lower surfaces 17B that are perpendicular to the longitudinal axis A—A of the tube 13. The rings 17 are positioned such that the lower surface 17B is exactly an even number of inches (or centimeters) from the lower surface 15A of flange 15. The flange 15 includes holes 19 for nails or screws (not shown) that hold the coupling in position on a pouring form (not shown) for the floor 100. The lower surface 15A of the flange 15 can also be secured to the form by gluing (not shown) or other suitable connection means.

The fitting assembly 10 is comprised of a fitting conduit 21 having an enlarged portion 23 on an outside sidewall 21A of the fitting conduit 21 and an annular gasket 25 mounted in an annular recess 27 on the enlarged portion 23. The fitting conduit 21 is preferably an elongate tubular member having a cylindrical inside sidewall 21B that is parallel with the outside sidewall 21A. The fitting conduit 21 is preferably made of a metal material, such as cast iron. The enlarged portion 23 has spaced apart ring members 29 and 31 that have concentric outer surfaces 29A and 31A around the axis A—A. A shoulder 29B portion of the upper ring 29 has a conical shape that tapers downwardly and outwardly around the axis A—A to the outer surface 29A. Similarly, a shoulder 31B portion of the lower ring 31 has a conical shape that tapers upwardly and outwardly around the axis A—A to the outer surface 31A. The annular recess 27 is provided between the ring members 29 and 31 and has a sidewardly positioned, elongate U-shaped cross-section around the axis A—A. The recess 27 is comprised of a concentric inner wall 27A between two perpendicular annular sidewalls 27B and 27C. The inner wall 27A has an annular radius similar to that of the outside sidewall 21A of the fitting conduit 21.

The annular gasket 25 is preferably made of a plastic (PVC) material. The gasket 25 is mounted in the recess 27 by providing the gasket 25 as a flexible ring in accordance with ASTM D2241. The gasket 25 is also preferably bonded or cement welded in the recess 27 with the inner surface 25A of the gasket 25 mounted on the inner wall 27A of the recess 27 and with the opposed sidewalls 25B and 25C mounted on the sidewalls 27B and 27C of the recess 27. In this position, the outer surface 25D of the gasket 25 is parallel with the outer surfaces 29A and 31A of the ring members 29 and 31 of the enlarged portion 23.

Table 1 is a chart showing the preferred dimensions for the adjustably mountable fitting assembly 10 for connecting various sizes of fluid carrying pipes 33 and 35 through the partition 100. The pipes 33 and 35 are preferably cast iron material, ASTM A48 no-hub size pipes. As shown in FIGS. 1 and 1A and in reference to Table 1, "A" represents the outside diameter of the fitting conduit 21, "B" represents the inside diameter of the fitting conduit 21, "C" represents the inside diameter of the annular recess 27, "D" represents the width of the annular gasket 25 along the A—A axis, "E" represents the length of the fitting conduit 21 along the A—A axis, "F" represents the outside diameter of the annular gasket 25 and "G" represents the inside diameter of the annular gasket 25.

TABLE 1

| Size of fluid pipes | A (in) | B (in) | C (in) | D (in) | E (in) | F (in) | G (in) |
| --- | --- | --- | --- | --- | --- | --- | --- |
| 2" | 2.30 | 1.90 | 2.10 | 1.20 | 12.00 | 2.37 | 2.19 |
| 3" | 3.30 | 2.90 | 3.20 | 1.20 | 12.00 | 3.50 | 3.33 |
| 4" | 4.30 | 3.90 | 4.20 | 1.20 | 12.00 | 4.50 | 4.28 |
| 6" | 6.30 | 5.90 | 6.20 | 1.20 | 12.00 | 6.63 | 6.30 |

IN USE

In use, the coupling 11 is first embedded in a cement partition means, such as floor 100, as shown in FIG. 1 and as previously described. The gasket 25 is solvent cemented in the recess 27 of the enlarged portion 23 of the fitting conduit 21 to provide the fitting assembly 10. The fitting assembly 10 is then mounted inside the coupling 11 with the outer surfaces 29A and 31A of the ring members 29 and 31 of enlarged portion 23 mounted on the inside wall 13A of the tube 13 of the coupling 11. The outer surface 25D of the gasket 25 is solvent cemented or bonded to the inside wall 13A of the tube 13 to seal the fitting assembly 10 inside the coupling 11. In this position, the outer surfaces 29A and 31A of the ring members 29 and 31 of the enlarged portion 23 are in contact with the inside wall 13A of the tube 13 of coupling 11. The conically tapered shoulders 29B and 31B serve as guides when the fitting assembly 10 is moved inside the coupling 11, no matter whether the fitting assembly 10 is moved inside the coupling 11 from above or below the partition 100. The enlarged portion 23 also provides for adjusting the sealing point between the fitting assembly 10 and the inside wall 13A of the tube 13 of coupling 11 along the majority of the length of the coupling 11. Preferably, the outer surfaces 29A and 31A of the ring members 29 and 31, of enlarged portion 23 are contacting the inside wall 13A of the coupling. This helps to brace the fitting assembly 10 inside the coupling 11.

Being able to adjust the mounting point of the fitting assembly 10 inside the coupling 11 provides for connecting the open ends 21C and 21D of the fitting Conduit 21 to the fluid carrying pipes 33 and 35, whether or not the pipes 33 and 35 had been previously mounted in an existing building construction. The open ends 21C and 21D of the fitting conduit 21 are preferably connected to the pipes 33 and 35 by means of standard steel reinforced band clamps 37. The fluid carrying pipes 33 and 35 can be made of a metal material, such as cast iron, or a plastic (PVC) material. The band clamps 37 are comprised of a flexible rubber or plastic sleeve 39 reinforced with a steel band (not shown) with a ring clamp 41 mounted in the middle of the sleeve 39. The inside of the sleeve 39 is provided with an integral annular rim 43. Preferably, the rim 43 is about midway between the ends of the sleeve 39.

To connect the open end 21C of the fitting conduit 21 to the fluid pipe 33, band clamp 37 with the ring clamp 41 in a loose position is first slid over the open end 21C of the fitting conduit 21 until the annular rim 43 abuts against the open end 21C. The open end of pipe 33 is then mounted inside the band clamp 37 until it abuts against the annular rim 43 of sleeve 39. Alternatively, the band clamp 37 can first be mounted over the open end of pipe 33 and then mounted over the open end 21C of fitting conduit 21. The procedure used is largely dictated by whether the pipe 33 has previously been mounted in a building construction, or not. If the pipe 33 has been previously mounted, the latter method is used with the band clamp 37 first being mounted on the pipe 33 and the fitting conduit 21 then being moved through the coupling 11 until the open end 21C abuts the rim 43 of sleeve 39. The ring clamp 41 is then tightened onto the sleeve 39 of the band clamp 37, forming a water tight seal between the fitting conduit 21 and the pipe 33. This procedure is repeated to connect pipe 35 to the open end 21D of the fitting conduit 21. This type of connection with the band clamp 37 is well known to those skilled in the art. Also, if the sleeve 39 of the band clamp 37 and the pipes 33 and 35 are plastic, they can be joined by solvent cement for added sealing.

It is contemplated by the scope of the present invention that the pipes 33 and 35 can also be connected to the fitting conduit 21 by mounting the pipes 33 and 35 inside the conduit 21. In this case, the outside diameter of the pipes 33 and 35 are preferably only slightly smaller than the inside sidewall 21B of the fitting conduit 21. This will provide the pipes 33 and 35 to be in contact to seal the pipes 33 and 35 to the inside sidewall 21B of the conduit 21. For added sealing, the pipes 33 and 35 can be solvent cemented or bonded inside the conduit 21.

As can be seen from the foregoing description, the present invention provides a unique device for mounting a fitting assembly 10 inside a coupling 11 that has been embedded in a partition means 100. Furthermore, the fitting assembly 10 prevents the spread of smoke and fire, and the seepage of water between the fitting assembly 10 and the coupling Also, the partition 100 can be a horizontal or a vertical partition and it can be made of concrete or other fire rated materials.

Numerous variations will occur to those skilled in the art. It is intended that the foregoing description be only illustrative of the present invention and that the present invention be limited only by the hereinafter appended claims.

I claim:

1. An improved fitting assembly adapted to be mounted in a coupling means having opposed open ends with an inside wall forming an opening along a longitudinal axis of the coupling means and with an outside wall adapted to be mounted in a partition means, for joining fluid carrying pipe means to the fitting assembly and which prevents the spread of smoke and fire, and the seepage of fluids between the fitting assembly and the coupling means, which comprises:
    (a) a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and
    (b) an annular gasket means mounted in the recess provided in the enlarged portion of the outside wall of the conduit means wherein when the conduit means is mounted inside the coupling means, outer diameters of the enlarged portion of the outside wall of the conduit means and of the gasket means mounted in the recess of the enlarged portion are only slightly smaller than a diameter of the inside wall of the coupling means and with the gasket means in contact with the inside wall of the coupling means to seal the conduit means to the inside wall of the coupling means to prevent the spread of smoke and fire, and the seepage of fluids between the fitting assembly and the coupling means.

2. The fitting assembly of claim 1 wherein the outside wall of the conduit means is parallel to the inside wall of the coupling means.

3. The fitting assembly of claim 1 wherein the partition means is made of poured concrete and the coupling means is at least temporarily mounted by an attachment means of the coupling means to a form for pouring the partition means to embed the coupling means in the partition means.

4. The fitting assembly of claim 1 wherein the coupling means and the conduit means each have a circular cross-section along the longitudinal axis.

5. The fitting assembly of claim 1 wherein the recess has an elongate, U-shaped cross-section perpendicular to the longitudinal axis.

6. The fitting assembly of claim 1 wherein the opposed ends of the conduit means extend beyond the opposed ends of the coupling means and beyond the partition means for connecting the pipe means to the opposed ends of the conduit means.

7. The fitting assembly of claim 6 wherein fluid carrying pipe means are securable to the opposed ends of the conduit means by a first and a second connection means.

8. The fitting of claim 1 wherein the partition means is a floor in a building and the longitudinal axis of the conduit means is vertically oriented through the partition means and wherein the conduit means serves to carry fluids between floors in the building through the fluid carrying pipe means mounted at the opposed ends of the conduit means.

9. The fitting assembly of claim 1 wherein the conduit means is made of a metal material and the gasket means is made of a plastic material, and wherein the gasket means is bonded to the conduit means in the recess of the enlarged portion of the conduit means.

10. The fitting of claim 5 wherein the coupling means is made of a plastic material and the gasket means is solvent cemented or bonded to the coupling means to provide an integral bond between the coupling means and the gasket means, which is mounted in the recess provided in the conduit means, to prevent the spread of smoke and fire, and the seepage of fluids between the conduit means and the coupling means.

11. The fitting assembly of claim 1 wherein the conduit means is made of cast iron.

12. The fitting assembly of claim 1 wherein a first and a second shoulder are provided on the enlarged portion, each shoulder having an annular taper extending from the outside wall of the conduit means to the outer diameter of the enlarged portion for mounting the conduit means inside the coupling means.

13. An improved fitting assembly adapted to be mounted in a coupling means having opposed open ends with an inside wall forming an opening along a longitudinal axis of the coupling means and with an outside wall adapted to be mounted in a partition means, for joining fluid carrying pipe means to the fitting assembly and which prevents the spread of smoke and fire, and the seepage of fluids between the fitting assembly and the coupling means, which comprises:
  (a) a non-flammable, elongate conduit means adapted to be mounted inside the coupling mean and having opposed open ends forming an opening along an inside wall of the conduit means along the axis, wherein an outside wall of the conduit means is spaced from the inside wall of the coupling means with the opposed ends of the conduit means extending along the axis beyond the opposed ends of the coupling means and beyond the partition means so that the conduit means is adapted to be connected to the pipe means at the opposed ends of the conduit means, wherein the pipe means are securable to the opposed ends of the conduit means by an adjustable band clamp means secured to an end of each of the fluid carrying pipe means and to each of the conduit means to secure the pipe means to the conduit means, and wherein the outside wall of the conduit means is provided with an enlarged portion having a recess; and
  (b) an annular gasket means mounted in the recess provided in the enlarged portion of the outside wall of the conduit means with the gasket means in contact with the inside wall of the coupling means to seal the conduit means to the inside wall of the coupling means to prevent the spread of smoke and fire, and the seepage of fluids between the fitting assembly and the coupling means.

14. A building construction for a building having a fitting assembly joined to fluid carrying pipe means and mounted inside a coupling means having opposed open ends with an inside wall forming an opening along a longitudinal axis of the coupling means and with an outside wall of the coupling means mounted in a partition means in the building, to prevent the spread of smoke and fire, and the seepage of fluids between the fitting assembly and the coupling means, which comprises:
  (a) the fitting assembly, which comprises: a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and an annular gasket means mounted in the recess in the enlarged portion of the outside wall of the conduit mans wherein when the conduit means is mounted inside the coupling means, outer diameters of the enlarged portion of the outside wall of the conduit means and of the gasket means mounted in the recess of the enlarged portion are only slightly smaller than a diameter of the inside wall of the coupling means and with the gasket means in contact with the inside wall of the coupling means to seal the conduit means to the inside wall of the coupling means and to prevent the spread of smoke and fire, and the seepage of fluids between the fitting assembly and the coupling means; and
  (b) fluid carrying pipe means connected to both ends of the conduit means.

15. The building construction of claim 14 wherein the outside wall of the conduit means is parallel to the inside wall of the coupling means.

16. The building construction of claim 14 wherein the partition means is made of poured concrete and the coupling means is at least temporarily mounted by an attachment means to the coupling means to a form for pouring the partition means to embed the coupling means in the partition means.

17. The building construction of claim 14 wherein the coupling means and the conduit means each have a circular cross-section along the longitudinal axis.

18. The building construction of claim 14 wherein the conduit means is made of a metal material and the gasket means is made of a plastic material, and wherein the gasket means is bonded to the conduit means in the recess of the enlarged portion of the conduit means.

19. The building construction of claim 18 wherein the coupling means is made of a plastic material and the gasket means is solvent cemented or bonded to the coupling means to provide an integral bond between the coupling means and the gasket means, which is mounted in the recess provided in the conduit means, to prevent the spread of smoke and fire, and the seepage of fluids between the conduit means and the coupling means.

20. The building construction of claim 14 wherein the conduit means is made of cast iron.

21. The building construction of claim 14 wherein a first and a second shoulder are provided on the enlarged portion, each shoulder having an annular taper extending from the outside wall of the conduit means to the outer diameter of the enlarged portion for mounting the conduit means inside the coupling means.

22. The building construction of claim 14 wherein the recess has an elongate, U-shaped cross-section perpendicular to the longitudinal axis.

23. The building construction of claim 14 wherein the opposed ends of the conduit means extend beyond the opposed ends of the coupling means and beyond the partition means for connecting the fluid carrying pipe means to the opposed ends of the conduit means.

24. The building construction of claim 14 wherein fluid carrying pipe means are secured to the opposed ends of the conduit means by a first and a second connection means.

25. The building construction of claim 14 wherein the partition means is a floor in a building and the longitudinal axis of the conduit means is vertically oriented through the partition means and wherein the conduit means serves to carry fluids between floors in the building through the fluid carrying pipe means mounted at the opposed ends of the conduit means.

26. A building construction for a building having a fitting assembly joined to fluid carrying pipe means and mounted inside a coupling means having opposed open ends with an inside wall forming an opening along a longitudinal axis of the coupling means and with an outside wall of the coupling means mounted in a partition means in the building, to prevent the spread of smoke and fire, and the seepage of fluids between the fitting assembly and the coupling means, which comprises:

(a) a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis beyond the opposed ends of the coupling means and beyond the partition means so that the conduit means is adapted to be connected to the pipe means at the opposed ends of the conduit means, wherein the pipe means are securable to the opposed ends of the conduit means by an adjustable band clamp means secured to an end of each of the fluid carrying pipe means and to each of the conduit means to secure the pipe means to the conduit means, and wherein the outside wall of the conduit means is provided with an enlarged portion having a recess; and (b) an annular gasket means mounted in the recess provided in the enlarged portion of the outside wall of the conduit means with the gasket means in contact with the inside wall of the coupling means to seal the conduit means to the inside wall of the coupling means to prevent the spread of smoke and fire, and the seepage of fluids between the fitting assembly and the coupling means.

27. An improved fitting assembly adapted to be mounted in a coupling means having opposed open ends with an inside wall forming an opening along a longitudinal axis of the coupling means and with an outside wall adapted to be mounted in a partition means, for joining fluid carrying pipe means to the fitting assembly and which prevents the spread of smoke and fire, and the seepage of fluids between the fitting assembly and the coupling means, which comprises:

(a) a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and (b) an annular gasket means bonded to the conduit means in the recess provided in the enlarged portion of the outside wall of the conduit means with the gasket in contact with the inside wall of the coupling means to seal the conduit means to the inside wall of the coupling means to prevent the spread of smoke and fire, and the seepage of fluids between the fitting assembly and the coupling means.

28. The fitting assembly of claim 27 wherein the coupling means and the gasket means are made of a plastic material and the gasket means is solvent cemented or bonded to the coupling means to provide an integral bond between the coupling means and the gasket means, which is mounted in the recess provided in the conduit means, to prevent the spread of smoke and fire, and the seepage of fluids between the conduit means and the coupling means.

29. A building construction for a building having a fitting assembly joined to fluid carrying pipe mans and mounted inside a coupling means having opposed open ends with an inside wall forming an opening along a longitudinal axis of the coupling means and with an outside wall of the coupling means mounted in a partition means in the building, to prevent the spread of smoke and fire, and the seepage of fluids between the fitting assembly and the coupling means, which comprises:

(a) the fitting assembly, which comprises: a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and an annular gasket means bonded to the conduit means in the recess in the enlarged portion of the outside wall of the conduit means with the gasket means in contact with the inside wall of the coupling means to seal the conduit means to the inside wall of the coupling means and to prevent the spread of smoke and fire, and the seepage of fluids between the fitting assembly and the coupling means; and (b) fluid carrying pipe means connected to both ends of the conduit means.

30. The building construction of claim 29 wherein the coupling means and the gasket means are made of a plastic material and the gasket means is solvent cemented or bonded to the coupling means and the gasket means, which is mounted in the recess provided in the conduit means, to prevent the spread of smoke and fire, and the seepage of fluids between the conduit means and the coupling means.

31. An improved fitting assembly adapted to be mounted in a coupling means having opposed open ends with an inside wall forming an opening along a longitudinal axis of the coupling means and with an outside wall adapted to be mounted in a partition means, for joining fluid carrying pipe mans to the fitting assembly and which prevents the spread of smoke and fire, and the seepage of fluids between the fitting assembly and the coupling means, which comprises:

(a) a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending along the axis beyond the opposed ends of the coupling means and beyond the partition means wherein the pipe means are secured to the opposed ends of the conduit means, and wherein the outside wall of the conduit means is provided with an enlarged portion having a recess; and (b) an annular gasket means mounted in the recess provided in the enlarged portion of the outside wall of the conduit mean with the gasket means in contact with the inside wall of the coupling means to seal the conduit means to the inside wall of the coupling means to prevent the spread of smoke and fire, and the seepage of fluids between the fitting assembly and the coupling means.

32. The fitting assembly of claim 31 wherein the pipe means are secured to the opposed ends of the conduit means by a first and second connection means.

33. The fitting assembly of claim 32 wherein the first and second connection means are comprised of adjustable band clamp means secured to an end of each of the pipe means and to each of the ends of the conduit means for securing the pipe mans to the conduit means.

34. An improved fitting assembly adapted to be mounted in a coupling means having opposed open ends with an inside wall forming an opening along a longitudinal axis of the coupling means and with an outside wall adapted to be mounted in a partition means, for joining fluid carrying pipe means to the fitting assembly and which prevents the spread of smoke and fire, and the seepage of fluids between the fitting assembly and the coupling means, which comprises:

(a) a non-flammable, elongate conduit means adapted to be mounted inside the coupling means and having opposed open ends forming an opening along an inside wall of the conduit means along the axis, wherein an outside wall of the conduit means is spaced from the inside wall of the coupling means with the opposed ends of the conduit means extending beyond the opposed ends of the coupling means and beyond the partition means along the axis wherein the pipe means are secured to each of the ends of the conduit means, and wherein the outside wall of the conduit means is provided with an enlarged portion having a recess; and (b) an annular gasket means permanently mounted in the recess provided in the enlarged portion of the outside wall of the conduit means wherein when the conduit means is mounted inside the coupling means, the enlarged portion of the outside wall of the conduit means is in contact with the inside wall of the coupling means to seal the conduit means to the inside wall of the coupling means to prevent the spread of smoke and fire, and the seepage of fluids between the fitting assembly and the coupling means.

35. A method for coupling pipe means through a partition means having a coupling means embedded in a partition means, wherein the coupling means has opposed open ends with an inside wall forming an opening along a longitudinal axis of the coupling means and with an outside wall mounted in the partition means, which comprises:

(a) providing a fitting assembly, which comprises: a non-flammable, elongate conduit means adapted to be mounted inside the coupling means and having opposed open ends forming an opening along an inside wall of the conduit means along the axis, wherein when the fitting assembly is mounted inside the coupling means, an outside wall of the conduit means is spaced from the inside wall of the coupling means with the opposed ends of the conduit means extending along the axis so that the conduit means is adapted to be connected to the pipe means at the opposed ends of the conduit means, and wherein the outside wall of the conduit means is provided with an enlarged portion having a recess; and an annular gasket means mounted in the recess provided in the enlarged portion of the outside wall of the conduit means to seal the conduit means to the inside wall of the coupling means and to prevent the spread of smoke and fire, and the seepage of fluids between the fitting assembly and the coupling means;

(b) sealing the conduit means inside the coupling means by bonding the gasket means, mounted in the recess of the conduit means, to the inside wall of the coupling means so that the opposed ends of the conduit means can be connected to fluid carrying pipe means; and (c) attaching fluid carrying pipe means to both ends of the conduit means.

36. The method of claim 15 wherein the partition means is made of poured concrete and the coupling means is at least temporarily mounted by an attachment means of the coupling means to a form for pouring the partition means for embedding the coupling means in the partition means.

37. The method of claim 15 wherein the conduit means is made of a metal material and the gasket means is made of a plastic material, and wherein the gasket means is bonded to the conduit means in the recess of the enlarged portion of the conduit means for sealing the fitting assembly inside the conduit means.

38. The method of claim 15 wherein the conduit means is made of cast iron.

39. The method of claim 15 wherein outer diameters of the enlarged portion of the outside wall of the conduit means and of the gasket means mounted in the recess of the enlarged portion are only slightly smaller than a diameter of the inside wall of the coupling means so that when the conduit means is mounted inside the coupling means, the enlarged portion and the gasket means are in contact with the inside wall of the coupling means for sealing the fitting assembly inside the conduit means embedded in the partition means.

40. The method of claim 15 wherein a first and a second shoulder are provided on the enlarged portion, each shoulder having an annular taper extending from the outside wall of the conduit means to the outer diameter of the enlarged portion for mounting the conduit means inside the coupling means.

41. The method of claim 15 wherein the opposed ends of the conduit means extend beyond the opposed ends of the coupling means and beyond the partition means for connecting the fluid carrying pipe means to the opposed ends of the conduit means.

42. The method of claim 21 wherein fluid carrying pipe means are secured to the opposed ends of the conduit means by a first and a second connection means for carrying fluids through the partition means.

43. The method of claim 22 wherein the first and second connection means comprise adjustable band clamp means secured to an end of each of the fluid carrying pipe means and to each of the ends of the conduit means for connecting the pipe means to the conduit means of the fitting assembly.

44. The method of 15 wherein the partition means is a floor in the building and the longitudinal axis of the conduit means is vertically oriented through the partition means and wherein the conduit means carries fluid between floors in the building through the fluid carrying pipe means mounted at the opposed ends of the conduit means.

45. The method of claim 15 wherein a sealing point between the fitting assembly and the coupling means is adjustable along the inside wall of the coupling means prior to bonding the gasket means to the inside wall of the coupling means to provide the sealing point.

* * * * *

UNITED STATES PATENT AND TRADEMARK OFFICE
CERTIFICATE OF CORRECTION

PATENT NO. : 5,263,746

DATED : November 23, 1993

INVENTOR(S) : Kenneth R. Cornwall

Page 1 of 3

It is certified that error appears in the above—identified patent and that said Letters Patent is hereby corrected as shown below:

Column 1, line 50, "pi" should be --pipes--.

Column 3, line 61, after "that" and before "in", --mounts-- should be inserted.

Column 5, line 27, after "coupling" and before "embedded", --11-- should be inserted.

Column 5, line 42, after "coupling" and before "in" --11-- should be inserted.

Column 7, line 63, after "coupling" and before "Also", --11.-- should be inserted.

Column 9, line 8 (Claim 10), "fitting of Claim 5" should read --fitting assembly of Claim 9--.

Column 10, line 19 (Claim 14), "mans" should be --means--.

Column 12, line 26 (Claim 29), "mans" should be --means--.

Column 12, line 61 (Claim 30), after "means" and before "and the gasket", the following should be inserted --to provide an integral bond between the coupling means--.

Column 13, line 3 (Claim 31), "mans" should be --means--.

UNITED STATES PATENT AND TRADEMARK OFFICE
CERTIFICATE OF CORRECTION

PATENT NO. : 5,263,746

DATED : November 23, 1993

INVENTOR(S) : Kenneth R. Cornwall

It is certified that error appears in the above—identified patent and that said Letters Patent is hereby corrected as shown below:

Column 13, line 22 (Claim 31), "mean" should be --means--.

Column 13, line 35 (Claim 33), "mans" should be --means--.

Column 14, line 43 (Claim 37), "Claim 15" should be --Claim 35--.

Column 14, line 49 (Claim 38), "Claim 15" should be --Claim 35--.

Column 14, line 51 (Claim 39), "Claim 15" should be --Claim 35--.

Column 14, line 61 (Claim 40), "Claim 15" should be --Claim 35--.

Column 14, line 67 (Claim 41), "Claim 15" should be --Claim 35--.

UNITED STATES PATENT AND TRADEMARK OFFICE
CERTIFICATE OF CORRECTION

PATENT NO.  :  5,263,746
DATED       :  November 23, 1993
INVENTOR(S) :  Kenneth R. Cornwall It is certified that error appears in the above—identified patent and that said Letters Patent is hereby corrected as shown below:

Column 15, line 4 (Claim 42), "Claim 21" should be --Claim 41--.

Column 15, line 8 (Claim 43), "Claim 22, should be --Claim 42--.

Column 16, line 1 (Claim 44), "Claim 15" should be --Claim 35--.

Column 16, line 8 (Claim 45), "Claim 15" should be --Claim 35--.

Signed and Sealed this

Seventeenth Day of May, 1994

Attest:

BRUCE LEHMAN

*Attesting Officer*    *Commissioner of Patents and Trademarks*